United States Patent Office 3,363,398
Patented Jan. 16, 1968

3,363,398
SULPHUR TRIOXIDE
John Brian Wheatcroft, Newbold, Chesterfield, and Anthony Roy Willacy, Calow, Chesterfield, England, assignors to Stanton & Staveley Limited, Stanton-by-Dale, near Ilkeston, England, a British company
No Drawing. Filed Mar. 23, 1965, Ser. No. 442,172
8 Claims. (Cl. 55—5)

This invention relates to sulphur trioxide.

According to one aspect of the invention there is provided discrete portions of solid sulphur trioxide. These portions can be in a variety of sizes ranging from pellets or beads to large irregularly shaped masses weighing several hundreds of grams. The portions may vary in size from ¼″ to several inches in diameter. The sulphur trioxide is preferably in the highly polymerised state, known variously as the α or γ form. The pellets or beads are of a convenient size preferably having a diameter of the order of one quarter of an inch (about 2 g. in weight) and the larger bodies may range in weight from a few grams to several hundred grammes, preferably about 30 g. The discrete portion of solid sulphur trioxide may be provided with a coating which is impervious to sulphur trioxide vapour and normal atmospheric moisture. This coating or casing may consist of a combustible or volatile coating or both—it may also comprise a material which is sufficiently low in mechanical strength to permit easy rupture when the internal pressure rises steeply or a material which is fusible or decomposable at the temperature in use. The coating or casing material is preferably inert or is beneficial to the other reactants with which the solid sulphur trioxide is to be used.

According to another aspect of the invention there is provided a method of mixing sulphur trioxide with a gas comprising introducing discrete portions of solid sulphur trioxide into the gas when the latter has a temperature greater than the sublimation temperature of the sulphur trioxide. The discrete portions may be provided with a coating or casing as described herein which breaks up after the portions have been introduced into the gas stream. Preferably the coating or casing ruptures due to pressure exerted by the evaporating sulphur trioxide. Alternatively the temperature of the gas stream may be sufficiently high to bring about liquefaction of the casing or its vaporisation or decomposition or its combustion. Adequate mixing of the sulphur trioxide and the gas which is being dosed occurs through the vaporisation of the solid sulphur trioxide which is preferably in the highly polymerised α form (sometimes known as γ sulphur trioxide). This method of mixing sulphur trioxide with a gas is particularly useful for removing dust particles from waste gases from boilers. The discrete portions of sulphur trioxide may be introduced into the waste gas stream where a mechanical separator and an electrostatic precipitator are being used, where a mechanical separator only is being used or where an electrostatic precipitator only is being used. In the first case the solid sulphur trioxide may be introduced downstream of the mechanical separator and upstream of the electrostatic precipitator. In the second and third cases the solid sulphur trioxide is preferably introduced upstream of the mechanical separator or electrostatic precipitator. Where the portions are coated, the coating material should be volatile, or fusible, or combustible or decomposable at the temperatures in use or, alternatively, be sufficiently thin to allow easy rupture when the internal pressures rises in sympathy with the increase in external temperature.

We have found that it is simpler to store and to transport sulphur trioxide in discrete portions of the solid than liquid sulphur trioxide. In storing and transporting liquid sulphur trioxide it is necessary either that the liquid is maintained at a temperature above its melting point and preferably about 30° C. or that the hazardous operation of re-melting sulphur trioxide must take place before the sulphur trioxide can be used. Further with the liquid sulphur trioxide it is necessary to stabilise the liquid and great care must be taken to prevent the liquid being contaminated with substances which would lead to polymerisation of the sulphur trioxide to the α-form. The coating is provided to prevent the portions coagulating in those circumstances where this would normally take place. The coating is also provided to prevent absorption of moisture and to prevent fuming.

This coating or casing for the polymerised sulphur trioxide presents many problems. Ideally it should for example, be chemically resistant to sulphur trioxide which is a highly reactive substance, be reasonably impermeable to water vapour and be sufficiently strong mechanically to withstand impact and abrasion. It should also be able, when subjected to an atmosphere sufficiently above ambient temperatures, to expose its contents by one or more of the mechanisms already mentioned viz. rupture, melting, vapourisation, decomposition or combustion. Several substances have been found to meet sufficiently these requirements to give a suitable coating. Outstanding performance however, is given by polytetrafluoroethylene (e.g. that sold under the Registered Trade Marks Fluon, and Teflon) and the fluorochloro hydrocarbon polymers such as polytrifluorochloroethylene (sold under such trade names as Kel-F and Aclar). We have found that substances which form an adequate coating include elemental sulphur, phthalic anhydride, tetrachlorophthalic anhydride, shellac modified by reaction with tetrachlorophthalic anhydride and relatively high melting polyolefins e.g. polyethylene melting at about 150° C.

The coated solid sulphur trioxide may be obtained by the following process: a container is first made by moulding the coating material just mentioned in the preceding sentence which is then charged with the desired amount of non-stabilised liquid sulphur trioxide and a closure then made by heat-sealing. The liquid sulphur trioxide is allowed to polymerise in situ after initiating this process by cooling to below 28° C. The advantages and disadvantages of these various materials as applied to the invention are tabulated below. Where the coated solid sulphur trioxide is to be used in forming mixtures of sulphur trioxide and gases it is preferable to have a casing material which is ejected, in some form or other, with the issuing hot gas stream rather than to have to remove debris from the engine system at periodic intervals and this is dealt with in the column headed "residence factors."

| Casing/Coating material | Resistance to SO₃ | Sturdiness (ambient) | Release mechanism | Residence factors |
|---|---|---|---|---|
| Sulphur | Excellent | Poor | Rupture melts at 113° C | Sublimes combustible. |
| Phthalic anhydride | do | Moderate | do | Do. |
| Tetrachlorophthalic anhydride | do | do | Rupture melts at 255° C | Combustible. |
| Modified shellac | Good | do | Rupture | Do. |
| Polyethylene | Moderate | Excellent | Rupture melts | Do. |

NOTE.—Release of the contained SO₃ by rupture refers to the behaviour of the coated portions when placed in a moving air stream at 100° C. and above; combustion of the casing remains does not take place except at temperatures in excess of 550° C., sulphur apart.

In the case of the chlorinated/fluorinated hydrocarbon polymers it has been found that it is best to use these in film form preferably as thin walled "lay-flat" tube, and to construct sachets of the required size which are then filled with the appropriate quantity of liquid sulphur trioxide before heat sealing: polymerization of the enclosed sulphur trioxide occurs in situ. The construction, filling and sealing of such sachets can be made automatic for purposes of commercial production by any of the known techniques in this art. In the case of these halogenated polymers, expulsion of the casing debris from waste gas systems will not occur except at temperatures high enough to cause extensive decomposition and oxidation of the resulting char, of the order of 550° C. and above. Where very small masses are being employed in association with high gas velocities, the casing may be carried along with the exhaust gases to be ejected with them but it will remain in the system in the majority of cases. This disadvantage however, is easily overcome by the provision of retractable catching screens (or similar devices) and is more than compensated by the excellent chemical and mechanical properties of these materials.

The assessment of some fluorinated or chlorinated/fluorinated materials is as follows:

| Casing/Coating material | Resistance to $SO_3$ | Sturdiness (ambient) | Release mechanism | Residence factors |
|---|---|---|---|---|
| Polyt. ethylene | Excellent | Good | Rupture | Decomposes. |
| Polytrifluorochloroethylene (Kel-F) | do | do | do | Do. |
| Aclar film | do | do | do | Do. |

The following examples illustrate the invention:

Example 1

Sachets of Aclar film, of 0.001" thickness, with one edge unsealed, were made up in various sizes ranging from about 1 cm. x 1 cm. to about 5 cm. x 5 cm. These were then filled with an appropriate quantity of unstabilized liquid sulphur trioxide, 2 g. in the case of the small containers and 30 g. for the larger ones. The open edge was then sealed by application of heat and polymerisation of the contents induced by refrigeration. On allowing the sachets to regain ambient temperature, there was obtained an encased quantity of $SO_3$ polymer which was sufficiently robust to withstand quite severe mechanical shock (e.g. being dropped onto a hard floor from a height of four feet or so) without damage. On being placed in a stream of moving air at 150° C., the sachets ruptured and the exposed sulphur trioxide gradually vapourised to become mixed with the air stream. It has been found that $SO_3$ polymer can be contained in Aclar film for many weeks without deterioration of coating or filling and it is likely that the storage life of $SO_3$ packed in this fashion is very long at ordinary temperatures.

Example 2

Tubes, closed at one end, were cast from molten polyethylene (M.P. 150° C.) to give containers of about 5 cm. length, 6 mm. diameter and having a wall thickness of about 0.004". After charging with 2 mls. of unstabilized liquid sulphur trioxide the tubes were heat-sealed and polymerisation of the contents induced by refrigeration. Containers made of polyethylene in this way were robust and could withstand severe mechanical shock. Examination of sectioned tubes however, showed significant charring of the inner wall showing that the tube would have a relatively short shelf-life. Rupture of the polythene casing with release of the contained $SO_3$ occured as the temperature was raised and was shown to take place readily at 100° C.

Use of tubes having much thicker walls would give a much longer shelf life.

Example 3

Three parts of shellac were reacted with five parts of molten tetrachlorophthalic anhydride at about 260° C. for ten minutes. The resulting preparation was used to cast containers of about the same size as in Example 2. After filling with liquid $SO_3$, heat-sealing the containers, and polymerising the contents there was obtained a capsule which was mechanically strong, with a slight tendency towards brittleness. This casing material ruptured with release of its contents without difficulty when exposed to temperatures of 100° C. and above. No evidence of attack of the inner wall was found on sectioning capsules made of shellac modified in the manner described above. The exact nature of the reaction between shellac and tetrachlorophthalic anhydride is unknown but it is suspected that esterification occurs. Unmodified shellac is insufficiently resistant chemically to $SO_3$ and oleums for use as a satisfactory casing material.

Example 4

Containers of about the same dimensions as in Example 2 were cast from molten tetrachlorophthalic anhydride and charged with $SO_3$ as in the previous examples. No evidence of attack of the casing by the contained sulphur trioxide polymer was obtained but from the mechanical point of view, the capsules were sufficiently brittle to suggest the possibility of some small proportion of fractures during handling and storage. Under test, the capsules ruptured easily at about 100° C.

Example 5

Small containers were cast in phthalic anhydride and charged with $SO_3$ as previously described the $SO_3$ was refrigerated to give a solid. As in the case of the tetrachloro compound, the material seemed satisfactorily resistant to $SO_3$ but the mechanical properties fell short of the ideal because of brittleness. Rupture with exposure of the encased $SO_3$ occurred readily at temperatures of 100° C. and above.

Example 6

Cast containers in elemental sulphur were made up in the way described in Example 2 and filled as before. No attack by $SO_3$ was observed but the mechanical properties of the casing were poor and it was concluded that it was desirable to pack each capsule separately during transit.

The coated discrete portions of solid sulphur trioxide as described herein may be used to make sulphuric acid, by rupturing the coating and placing the portions in water.

A coating or casing can be made by first coating the solid portions of sulphur trioxide with a substance with good resistance to $SO_3$ e.g. sulphur or phthalic anhydride and further coating with a substance having good mechanical properties e.g. polyethylene.

Where solid sulphur trioxide is coated with polytetrafluoroethylene, the polymer used may be in film or thin sheet form. Films of from 0.002" upwards are available and may be used to make sachets which are then filled with sulphur trioxide as described above.

We claim:

1. A method of precipitating dust particles in waste gas comprising the steps of passing said gas through a mechanical separator, introducing into said mechanically separated gas a discrete portion of solid sulphur trioxide in the highly polymerized α form and encased in a disintegratable casing material impervious to sulphur trioxide and atmospheric moisture while maintaining said gas at a temperature above the sublimation temperature of sulphur trioxide, whereby said sulphur trioxide vaporizes, said casing material disintegrates, and said sulphur trioxide is released and mixes wth said gas, and passing said sulphur trioxide containing waste gas through an electrostatic precipitator.

2. A method as claimed in claim 1 wherein said casing material is volatile at temperatures substantially above the freezing point of sulphur trioxide.

3. A method as claimed in claim 1 wherein said casing material comprises elemental sulphur.

4. A method as claimed in claim 1 wherein the casing material comprises an anhydride taken from the group consisting of phthalic anhydride and tetrachlorophthalic anhydride.

5. A method as claimed in claim 1 wherein the casing material comprises a combustible material.

6. A method as claimed in claim 1 wherein the casing material comprises shellac modified by reaction with tetrachlorophthalic anhydride and polyolefins.

7. A method as claimed in claim 1 wherein the casing material comprises a hydrocarbon polymer.

8. A method as claimed in claim 7 wherein said hydrocarbon polymer is taken from the group consisting of polyethylene, polytetrafluoroethylene and polytrifluorochloroethylene.

References Cited
UNITED STATES PATENTS

| | | | |
|---|---|---|---|
| 1,614,737 | 1/1927 | Kobbe | 206—2 |
| 1,693,251 | 11/1928 | Pick | 206—2 |
| 2,036,412 | 4/1936 | Henglein et al. | 206—2 |
| 2,618,409 | 11/1952 | Eisenberger et al. | 206—2 X |
| 2,841,242 | 7/1958 | Hall | 55—5 |
| 3,065,058 | 11/1962 | Perry et al. | 23—174 |
| 3,216,566 | 11/1965 | Rosenthal | 206—84 |

FOREIGN PATENTS 643,257   6/1962   Canada.

REUBEN FRIEDMAN, *Primary Examiner.*

SAMIH N. ZAHARNA, *Examiner.*

J. ADEE, *Assistant Examiner.*